United States Patent
Fourcade et al.

(10) Patent No.: US 8,215,723 B2
(45) Date of Patent: Jul. 10, 2012

(54) HYDRAULIC BRAKING CIRCUIT

(75) Inventors: Jean Fourcade, Champs sur Marne (FR); Philippe Richard, Chelles (FR); Chris Anderson, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 913 days.

(21) Appl. No.: 11/771,391

(22) Filed: Jun. 29, 2007

(65) Prior Publication Data
US 2008/0093920 A1    Apr. 24, 2008

(30) Foreign Application Priority Data
Jun. 30, 2006  (FR) ...................................... 06 06043

(51) Int. Cl.
*F16L 11/08* (2006.01)

(52) U.S. Cl. ............................ 303/30; 138/127; 138/123

(58) Field of Classification Search ................... 303/87, 303/DIG. 10, DIG. 11; 138/123, 126, 127, 138/28, 30
See application file for complete search history.

(56) References Cited

U.S. PATENT DOCUMENTS

| | | | | |
|---|---|---|---|---|
| 188,554 A | * | 3/1877 | Wakeman | 138/127 |
| 3,433,330 A | * | 3/1969 | Murray | 188/151 R |
| 3,473,565 A | | 10/1969 | Blendermann | |
| 3,665,967 A | * | 5/1972 | Kachnik | 138/137 |
| 3,766,992 A | * | 10/1973 | Tiraspolsky et al. | 175/25 |
| 5,036,110 A | * | 7/1991 | Moureaux | 521/137 |
| 5,246,761 A | * | 9/1993 | Sasaki | 428/156 |
| 5,286,101 A | * | 2/1994 | Kakizaki | 303/113.2 |
| 5,620,241 A | * | 4/1997 | Burgdorf | 303/186 |
| 6,089,273 A | | 7/2000 | Cooper et al. | |
| 6,247,763 B1 | * | 6/2001 | Rehn et al. | 303/30 |
| 6,620,472 B1 | * | 9/2003 | Shepard et al. | 428/35.4 |
| 2010/0071362 A1 | * | 3/2010 | Alaze et al. | 60/581 |

FOREIGN PATENT DOCUMENTS

| | | |
|---|---|---|
| DE | 4128386 A1 * | 3/1993 |
| WO | 97/14591 | 4/1997 |
| WO | 2006/066993 | 6/2006 |

OTHER PUBLICATIONS

FR0606043 Search Report and Opinion.

* cited by examiner

*Primary Examiner* — Robert A Siconolfi
*Assistant Examiner* — Stephen Bowes
(74) *Attorney, Agent, or Firm* — Michael Best & Friedrich LLP

(57) ABSTRACT

In order to prevent a vehicle fitted with braking assistance and trajectory correction devices and having a highly placed center of gravity from overturning in a bend when there is a sudden turn of the steering wheel at the same time as a sudden braking action, a hydraulic braking circuit comprising a hydraulic pump (3) which sucks a fluid contained in a reservoir (3) through a master cylinder (1), is provided with a bladder (10). The bladder, placed between the master cylinder and the hydraulic pump, reduces the duration of flow of the hydraulic fluid to the pump, ensuring a sufficient suction pressure at the entrance of the pump in order to cram the brake and cause the wheel having the most pressure to skid.

25 Claims, 4 Drawing Sheets

HYDRAULIC BRAKING CIRCUIT

BACKGROUND OF THE INVENTION

The subject of the present invention is a hydraulic braking circuit furnished with an enhanced device for supplying hydraulic fluid. Such a circuit is used to prevent a vehicle of large size, and particularly with a highly placed center of gravity that may cause an overturning torque, such as off-road 4×4 vehicles, from overturning when there is a considerable turn of the steering wheel in a bend or else when there is a strong brake application in a bend. The ultimate object of the invention is therefore to perfect the operation of the trajectory correction systems of a vehicle coupled to an improved braking system such as the anti-lock braking system.

SUMMARY OF THE INVENTION

When a driver presses on a brake pedal of a vehicle, the vehicle is slowed via a hydraulic braking circuit. In certain cases, the movement of a piston of a master cylinder that compresses the volume of the hydraulic fluid present in at least one chamber of the master cylinder is assisted by a pneumatic device. The pressure resulting therefrom is then amplified. This pressure makes it possible to trigger the braking device on at least one wheel of the vehicle.

During a skid or during a sudden braking of the vehicle by the driver, it is possible that, in addition to the usual pneumatic braking device mentioned above, a device for correcting the trajectory of the vehicle is put in place. This trajectory correction device may be of the ESP type, for Electronic System Program. This trajectory correction device has electronic sensors that detect the abnormal dynamic behavior of the vehicle. This device then provides a trajectory correction by the additional application or release of the brakes of at least one wheel of the vehicle without the driver deciding to do so.

The problem is that imposing and in particular high vehicles on the road have a tendency to overturn when the braking is too effective and above all in a bend.

In order to prevent too great a pressure of the wheel put under most strain, that is to say the one most frequently situated pressing on the front and to the outside of the bend, the invention allows this wheel to skid.

For this purpose, the brake corresponding to the wheel that it is desired to allow to skid on the ground will be crammed rapidly and for a little longer. This prevents the vehicle from overturning. This cramming must be able to be achieved thanks to a means that is simple, low-cost and easy to mount on a vehicle. In addition, it is envisaged to fit it to vehicles that are already in service and do not have it. The trajectory correction device operates thanks to a hydraulic pump. This pump generates a pressure making it possible to brake at least one wheel harder. To generate this pressure, the hydraulic pump must suck brake fluid normally originating from the brake fluid reservoir.

The pump being situated downstream of the master cylinder, the brake fluid must travel through the master cylinder to reach the pump. The master cylinder has a structure such that it comprises ducts and cross-sectional narrowings substantially slowing the speed of flow of the hydraulic fluid through it. The speed of flow of the hydraulic fluid through the master cylinder is also slowed due to hydraulic fluid pressure losses due to friction and to the physicochemical character of this hydraulic fluid. The hydraulic fluid flow time therefore helps to define a reaction time of the vehicle when braking. The longer and more sinuous the path that the fluid has to travel, the longer this reaction time.

In order to reduce this reaction time of the vehicle when braking, the flow of the fluid in the ducts of the hydraulic braking circuit must be made easier. For this, it could be possible to widen the cross sections of the passageway inside the master cylinder. However, this possibility is limited by the constraints associated with the space restrictions of the elements present inside the vehicle that do not make it possible to widen the master cylinder at will. In addition, in order that the trajectory correction device is economically profitable, the structure of the master cylinder and the structure of the trajectory correction device of the vehicle must be changed as little as possible. In addition, such a solution cannot be envisaged on vehicles already produced.

The problem is that it is not possible to supply the necessary volume of brake fluid with sufficient pressure to ensure a sufficient level of suction at the inlet of the hydraulic pump that is necessary in order to shorten the response time.

To shorten the reaction time of the trajectory correction system and reduce the pressure losses, while avoiding modifications to optimize the flow inside the master cylinder, the invention therefore proposes a hydraulic circuit furnished with a means for injecting an additional volume, typically one or more cramming bladders situated between the master cylinder and the hydraulic pump.

The hydraulic braking circuit therefore comprises a master cylinder and at least one piston that moves the hydraulic fluid in the hydraulic braking circuit. This hydraulic brake fluid operates a braking mechanism. This braking mechanism usually comprises at least one brake pad or plates pressing on at least one hub or at least one wheel disk. When a driver presses, with his foot, on a brake pedal of a vehicle, a control rod connected to this brake pedal moves at least one piston of the master cylinder of the hydraulic braking circuit. The piston then compresses a volume of hydraulic fluid contained in a reservoir of the master cylinder. The result of this compression is a pressure of hydraulic fluid at the outlet of the master cylinder.

The hydraulic pressure causes the hydraulic fluid in the various ducts of the hydraulic braking circuit to move. This hydraulic pressure makes it possible to brake at least one wheel of the vehicle. Therefore the hydraulic fluid, by its pressure, may compress brake pads against brake disks attached to a hub to at least one wheel of the vehicle.

At the end of a braking action, a portion of the hydraulic fluid present in the ducts of the hydraulic braking circuit returns to the master cylinder. This return of the hydraulic fluid to the master cylinder takes place through the release of the pressure in the master cylinder, and is due to different return forces exerted on the elements of the circuit. For the rest, the fluid becomes immobile in the ducts of the hydraulic braking circuit.

To ensure the rapid cramming of the hydraulic circuit while taking account of the absorption, the invention proposes a circuit furnished with a bladder situated upstream and preferably close to the hydraulic pump. This bladder operates at the very beginning of the braking phase, during the very first millimeters of travel and consists in cramming the ducts of the hydraulic braking circuit with hydraulic fluid, at the very beginning of the braking phase, in order to reduce the absorption phase.

The invention therefore consists in a hydraulic braking circuit of a vehicle comprising a master cylinder, a hydraulic pump characterized in that it comprises a bladder in order to inject an additional volume of hydraulic fluid by suction by the hydraulic pump, this suction deforming a membrane of the bladder under a vacuum effect.

BRIEF DESCRIPTION OF THE DRAWINGS

The invention will be better understood on reading the following description and on examining the figures accompanying it. The latter are presented only as an indication and are in no way limiting of the invention.

FIG. 1: a schematic representation of a hydraulic braking circuit of the invention furnished with a bladder.

DETAILED DESCRIPTION

Figure 1:
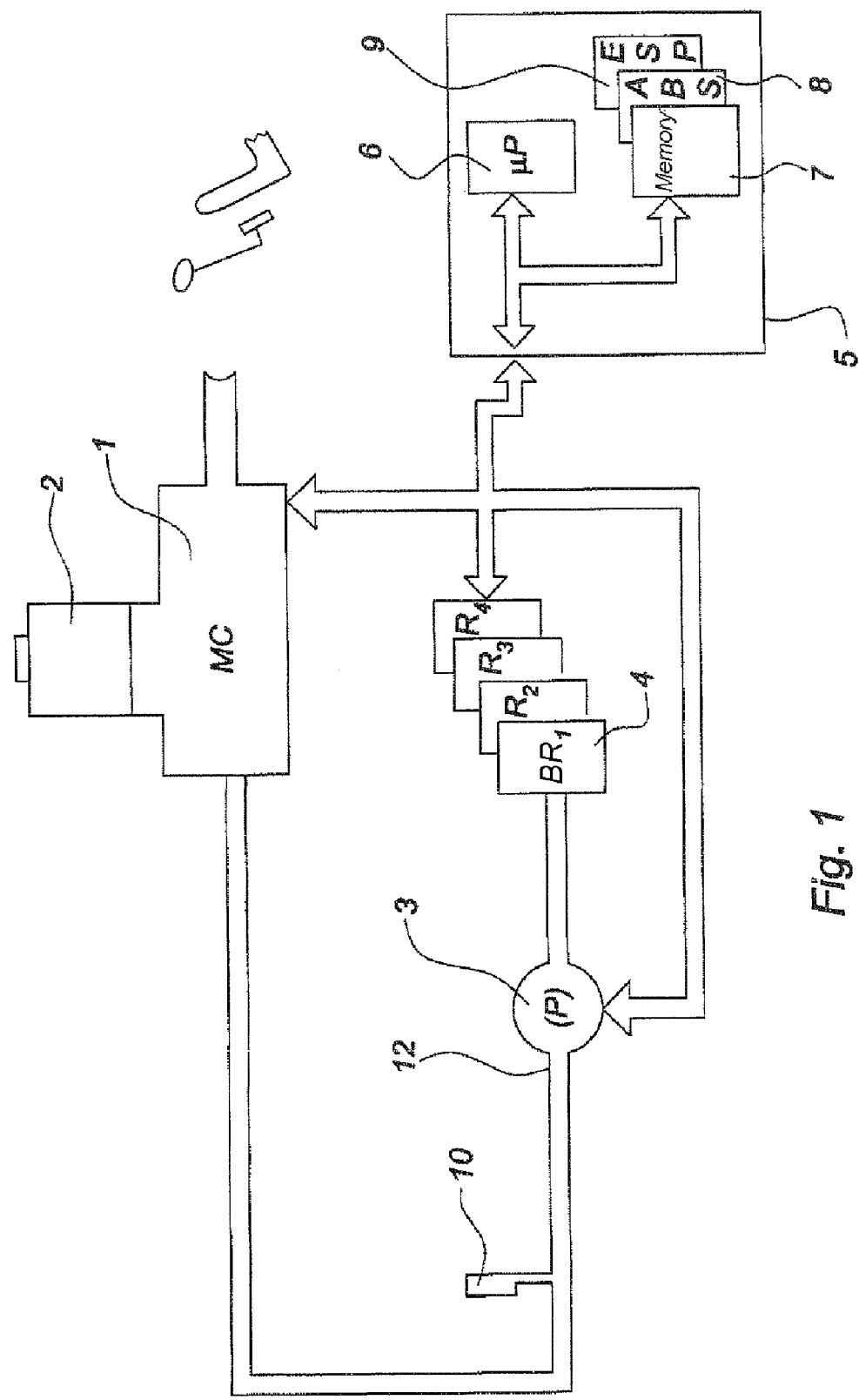
FIG. 1 shows.

FIG. 1 represents schematically the hydraulic braking circuit of the invention. Following the brake pedal control there is a master cylinder 1 fitted with its reservoir of hydraulic fluid 2. Downstream of the master cylinder 1 on the hydraulic circuit there is the hydraulic group fitted with its hydraulic pump 3. Downstream of this same hydraulic pump 3 there are the four brakes 4 corresponding to the four wheels of the vehicle. An integral portion of the hydraulic circuit is an electronic module 5 having a software program and comprising a microprocessor 6, a memory card 7 and respectively the anti-lock braking system (ABS) 8 and the trajectory control system (ESP) 9.

This electronic module 5 is linked both to the master cylinder 1 and the hydraulic pump 3 but also and above all to the sensors that are on each of the wheel brakes of the vehicle. A software program incorporated into the hydraulic module therefore makes it possible for the ABS and the ESP to manage the behavior of the vehicle during a trajectory and during a braking action according to the data gathered from the wheel sensors.

Along this hydraulic circuit, a cramming bladder 10 is positioned on the hydraulic circuit between the master cylinder 1 and the hydraulic pump 3.

In the context of a normal braking action with a vehicle on a conventional road, the quantity of hydraulic fluid present in the circuit and present in the brake fluid reservoir makes it possible to ensure a correct suction of the fluid from the hydraulic pump to the brakes.

The electronic module 5, for its part, makes it possible in this case to correctly manage the right brake metering with an optimal performance therefore without there being any wheel locking and maintaining the desired trajectory of the vehicle.

In this case, all the wheels maintain a good grip and it is possible to manage the braking and the trajectory of the vehicle according to a braking action that takes slightly longer, and even a release of the brakes.

Figure 2:
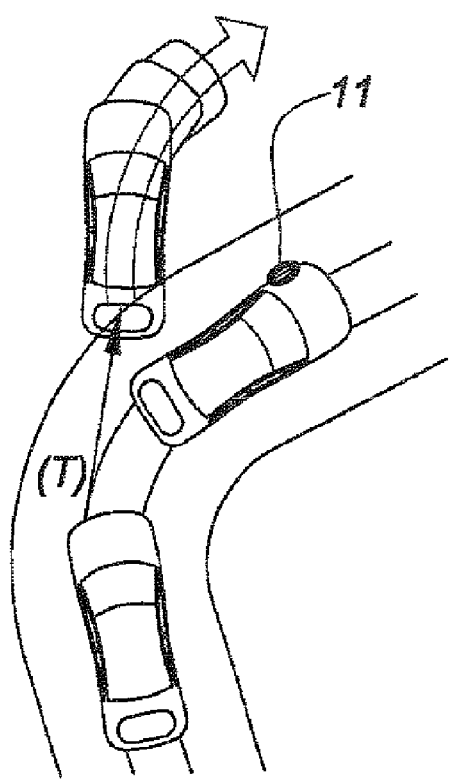
FIG. 2: a representation of a vehicle on a trajectory.

FIG. 2; in the context of the invention, the driver brakes suddenly in a sudden bend and/or turns the steering wheel in a sharp bend, with a vehicle having the particular feature of having a highly placed center of gravity.

In a normal operation of the vehicle, this situation imposes, in a fraction of a second, an immediate reaction of the electronic module 5 comprising the management of the trajectory system (ESP) 9, and of the anti-lock braking system (ABS) 8. But for certain types of vehicle, the trajectory assistance and/or the braking assistance are too severe. Specifically, on a high clearance-type vehicle, the weight transfers are considerable and the tendency is very strong for this type of vehicle to overturn. To prevent this overturn, the aim is to cause understeer, that is to say to open the trajectory of the bend and therefore to take a tangent (T) in this bend.

Because of a very considerable pressure of the front wheel 11 on the outside of the bend, this wheel serves as a pivot point to the vehicle by lifting the vehicle on its wheels on the inside of the bend and by causing a beginning of an overturn or even an overturn.

An overturn of the vehicle may be prevented thanks to the hydraulic circuit of the invention. When an overturn possibility is detected, the hydraulic pump 3 is commanded to apply a greater suction involving a cramming of the brake corresponding to this pivot wheel 11.

The forced cramming of the front wheel 11 on the outside of the bend implies a locking of this wheel that then skids on the pavement and causes a controlled understeer of the vehicle as shown in its grayed position.

Therefore, the vehicle avoids the overturn and the other wheels of the vehicle resume a grip making it possible again to manage normally the correct continuation of the trajectory and maintain braking performance.

It is well understood that this cramming and this skidding of the wheel 11 of the vehicle occur in a fraction of a second and do not bring into question a crossing of the pavement or even the vehicle leaving the road.

The instruction given by the electronic module 5 to the hydraulic pump 3 to suck a quantity of brake fluid sufficient to cram the wheel concerned occurs very rapidly, so it is then necessary to have a sufficient volume of hydraulic fluid in the circuit.

For these large vehicles, the quantity of hydraulic fluid present in the circuit and the time necessary to collect the necessary volume from the hydraulic fluid reservoir are respectively too small or too long.

Specifically, it is necessary to provide a sufficient volume with a sufficient pressure at the inlet of the hydraulic suction pump 3.

The cramming bladder 10 responds to this demand. For this, it will be placed preferably on the hydraulic circuit close to the inlet 12 of the hydraulic pump 3.

The bladder may be replaced by a refillable canister with a movable bottom or a canister with edges with bellows.

Figure 3:
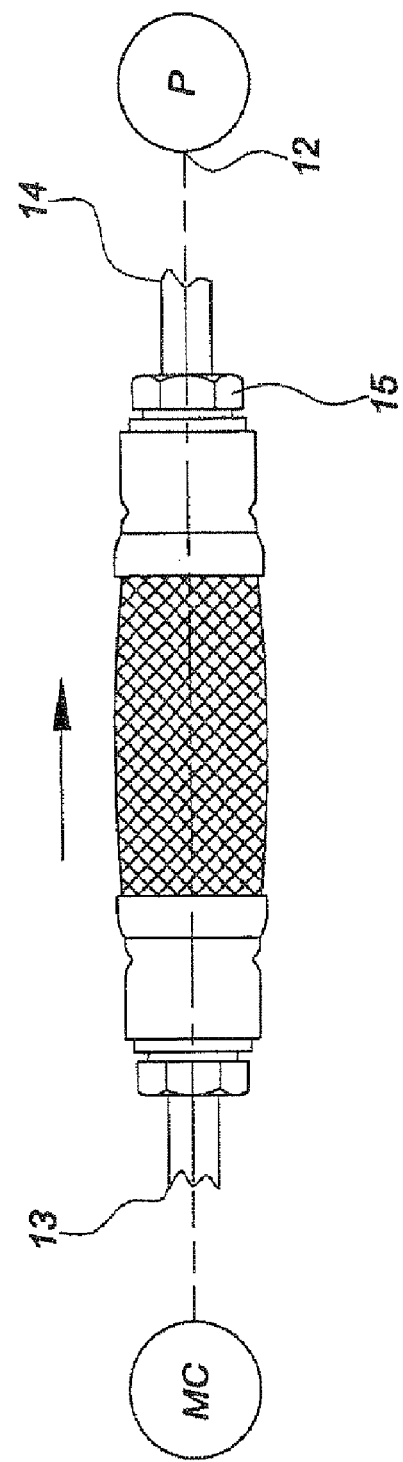
FIGS. 3 and 4: a bladder of the circuit of the invention in two mounting positions.

FIG. 3 shows a cramming bladder 10 of the circuit of the invention. In this case, it is mounted in series on the hydraulic circuit having a hydraulic circuit inlet 13 downstream of the master cylinder and a hydraulic fluid outlet 14 upstream of the hydraulic pump 3. This type of installation therefore presents for the bladder two ends with an inflow and an outflow.

Figure 4:
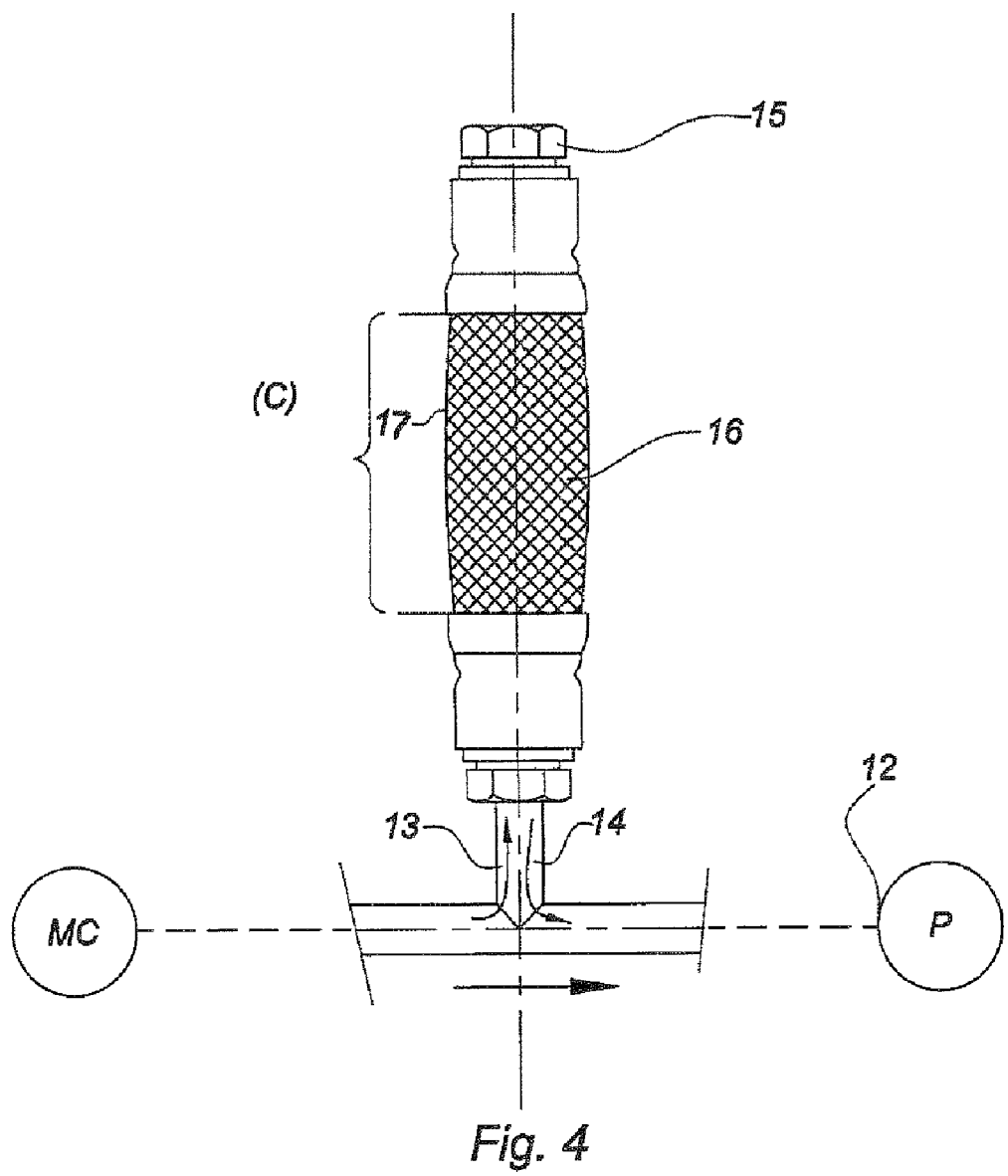

FIG. 4 shows a type of installation with a bladder as a branch in parallel. It therefore forms a T with the hydraulic circuit between the upstream of the master cylinder and the downstream of the hydraulic pump. The end of the bladder on this T therefore serves as the inlet 13 and outlet 14 of the hydraulic fluid.

In FIG. 3 and FIG. 4, the corresponding bladders each have a bleed 15 making it possible to bleed the air that may be present within the bladder itself.

This or these types of series and parallel installations are made on one or more free sections of the circuit of the invention. Specifically, depending on the quantity of hydraulic fluid necessary to cram one or more brakes of the vehicle, it will be possible to place one or more cramming bladders on sections dedicated to the installation of these bladders along the hydraulic circuit.

In FIG. 4, the main body (C) of the bladder comprises a metal braid 16. This metal braid 16 is porous to the air and comprises a sufficiently fine mesh to prevent any possible extrusion of a membrane 17 that is on the inside. The membrane 17 is rubber-based. The metal braid 16 comprises convex edges allowing the membrane 17 that is on the inside to closely match an oblong symmetrical pear shape. Thanks to the pressure of the air passing through the metal braid 16, the elastic membrane 17 retains and contains the brake fluid at atmospheric pressure.

Figure 5:
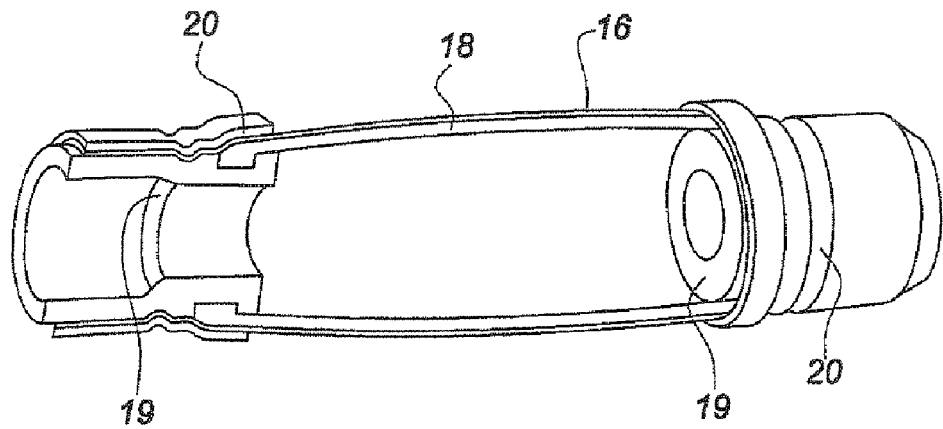
FIGS. 5, 6 and 7: views in section of the bladder of the circuit of the invention respectively at rest, in action and at the maximum of its action.

FIG. 5 shows in section the thickness of the metal braid 16 and the deformable rubber membrane 17 forming the brake fluid container. Two hydraulic end-pieces 19 are necessary for fastening a bladder 10 to the hydraulic circuit.

Two crimping rings 20 are necessary in order to firmly hold the bladder 10 on the hydraulic circuit. It can be found that the installations as defined in FIGS. 3 and 4 are easy to produce on the hydraulic circuit. The membrane 17, engaged in the braid 16, is mounted at one end around an end-piece 19 that penetrates it.

The crimping ring 20 surrounds this end and clamps it, crimps it onto the end-piece 19. This ensures that the installation is sealed. The end-piece 19 furthermore comprises, at a portion external to the bladder, a threading or a staged clip that can be fitted to a section of the hydraulic circuit provided for this purpose.

It will be sufficient in the context of a series installation to cut off a section of hydraulic circuit and then insert the bladder 10 and crimp each end. In the case of an installation in a parallel branch, the T also being provided in advance, it is sufficient to open this portion and crimp the bladder onto one end only.

Figure 6:
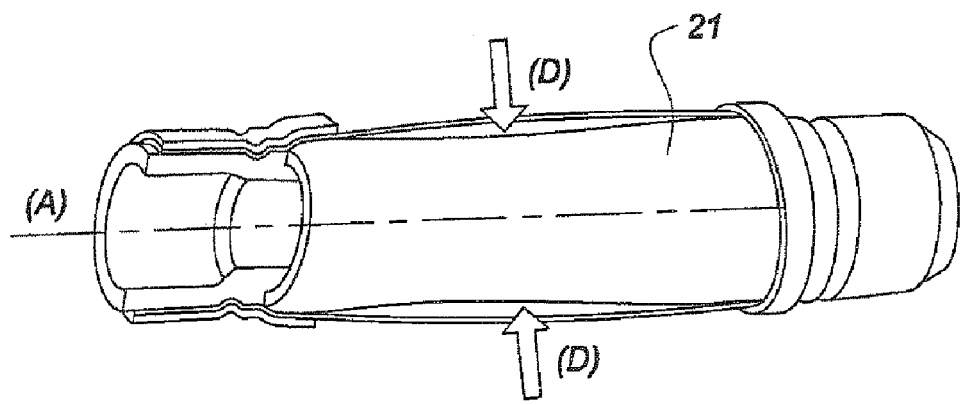

In FIG. 6, during a brake cramming action, the rubber membrane 17 of the bladder 10 deforms. The walls 18 of the membrane 17 are convex and, at rest, closely match the shape of the internal edges of the metal braid 16 thus defining an initial position. Then, during the cramming action, the walls 18 collapse by suction of the hydraulic pump 3. This suction, by a vacuum effect in the circuit due to a sudden and severe demand for hydraulic fluid, deforms the walls 18 of the membrane 17 in the direction (D) of the internal axis (A) of the body of the bladder 10. Between the two positions, successively at rest then in a vacuum of the walls 18 of the membrane 17, a volume (V) of brake fluid of the bladder 10 is sucked into the circuit.

Figure 7:
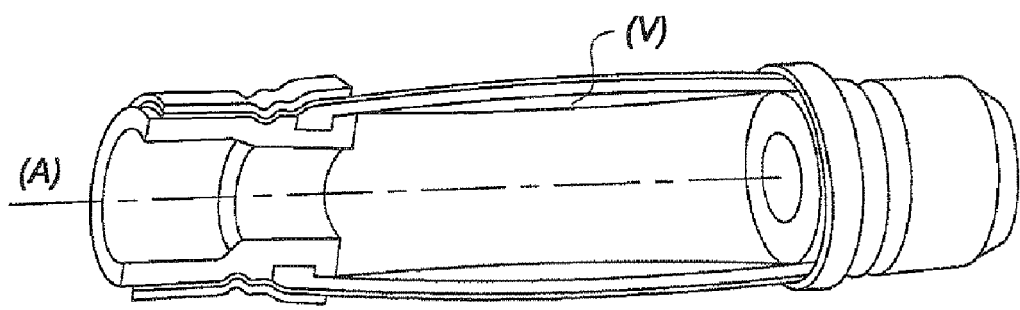

In FIG. 7, the maximum limit volume (V) that can be supplied by the cramming bladder is reached. The walls 18 of the elastic membrane 17 of the bladder have deformed to the maximum of their capabilities.

It is then possible in this way to define the maximum available volume (Vmax) of the cramming bladder separating the edge at the time of its rest position from its maximum cramming position. It is this maximum available volume (Vmax) present between the convex and concave positions of the walls 18 of the membrane 17 that defines the necessary number of bladders 10 or else the necessary size of the bladder for the circuit cramming system to operate correctly.

So that the membrane 17 can take in succession a convex or concave position along a straight line linking each of the ends of the two hydraulic end-pieces, it is necessary that the bladder 10 has an elongated and circular cylindrical shape. This shape will be given in a proportion such that the length of the envelope 21 formed by the membrane 17 is at least twice the dimension of its diameter.

The invention claimed is:

1. A hydraulic braking circuit of a vehicle comprising:
a master cylinder (1); and
a hydraulic pump (3);
characterized in that a bladder (10) comprises at its periphery a metal braid (16), the metal braid (16) being porous to and exposed to ambient air and retaining a membrane (17) in order to inject an additional volume of hydraulic fluid by suction by the hydraulic pump (3), this suction deforming the membrane (17) of the bladder (10) under a vacuum effect, the membrane (17) having an outer surface directly engageable with the metal braid (16) and exposed to the ambient air through the metal braid (16), the membrane (17) having an inner surface exposed to the hydraulic fluid.

2. The circuit according to claim 1, characterized in that the bladder (10) is situated downstream of the master cylinder (1) and upstream of the hydraulic pump (3).

3. The circuit according to claim 2, characterized in that the bladder (10) is mounted with an inlet (13) for hydraulic fluid at one of its two ends and an outlet (14) for hydraulic fluid at its other end, this end being connected in series to the circuit.

4. The circuit according to claim 3, characterized in that the circuit comprises several bladders.

5. The circuit according to claim 4, characterized in that the circuit comprises one or more free sections in order to receive one or more bladders irrespective of how they are mounted.

6. The circuit according to claim 5, characterized in that the membrane (17) is formed of deformable rubber.

7. The circuit according to claim 6, characterized in that the bladder comprises an air bleed (15).

8. The circuit according to claim 7, characterized in that the bladder has an elongated and circular cylindrical shape with a length that is twice the dimension of its diameter.

9. The circuit according to claim 1, characterized in that the bladder is mounted with only one end serving as an inlet and outlet for the hydraulic fluid, this end being connected as a branch in parallel with the circuit.

10. The circuit according to claim 9, characterized in that the circuit comprises several bladders.

11. The circuit according to claim 10, characterized in that the circuit comprises one or more free sections in order to receive one or more bladders irrespective of how they are mounted.

12. The circuit according to claim 11, characterized in that the membrane (17) is formed of deformable rubber.

13. The circuit according to claim 12, characterized in that the bladder comprises an air bleed (15).

14. The circuit according to claim 13, characterized in that the bladder has an elongated and circular cylindrical shape with a length that is twice the dimension of its diameter.

15. The circuit according to claim 1, characterized in that the circuit comprises several bladders.

16. The circuit according to claim 1, characterized in that the circuit comprises one or more free sections in order to receive one or more bladders irrespective of how they are mounted.

17. The circuit according to claim 1, characterized in that membrane (17) is formed of deformable rubber.

18. The circuit according to claim 1, characterized in that the bladder comprises an air bleed (15).

19. The circuit according to claim 1, characterized in that the bladder has an elongated and circular cylindrical shape with a length that is twice the dimension of its diameter.

20. The circuit according to claim 1, characterized in that the metal braid (16) is formed of a fine mesh.

21. The circuit according to claim 1, characterized in that the metal braid (16) has wall with a convex shape, and in that, at least in a rest position, the membrane (17) has a wall with a shape closely matching the convex shape of the wall of the metal braid (16).

22. The circuit according to claim 1, characterized in that a hydraulic end piece (19) is connected to each end of the bladder (10), each end piece (19) having an outer surface defining an annular groove, and in that, at each end, the membrane (17) has an inner annular rim positioned in the groove of an associated end piece (19).

23. The circuit according to claim 22, characterized in that a portion of each end piece (19) extends into an associated end of the membrane (17) to an axially inner end.

24. The circuit according to claim 23, characterized in that the membrane (17) between the axially inner end of the end pieces (19) is unsupported and deforms under a vacuum effect.

25. The circuit according to claim 22, characterized in that a crimping ring (20) surrounds each end of the bladder (10), each crimping ring (20) being crimped onto an associated end of the bladder (10) to seal the membrane (17) to the end piece (19).

* * * * *